United States Patent [19]
O'Brien

[11] Patent Number: 6,031,519
[45] Date of Patent: Feb. 29, 2000

[54] HOLOGRAPHIC DIRECT MANIPULATION INTERFACE

[76] Inventor: Wayne P. O'Brien, 507 N. Roosevelt Blvd., C 315, Falls Church, Va. 22044

[21] Appl. No.: 09/001,101

[22] Filed: Dec. 30, 1997

[51] Int. Cl.[7] .................................................. G09G 5/00
[52] U.S. Cl. ........................... 345/156; 157/173; 157/139
[58] Field of Search ..................................... 345/156, 157, 345/158, 159, 162, 163, 169, 168, 173, 179, 180, 181, 182, 183, 419, 139, 145, 146; 359/9, 22, 23, 24, 31

[56] References Cited

U.S. PATENT DOCUMENTS

| | | |
|---|---|---|
| Re. 33,662 | 8/1991 | Blair . |
| 4,518,361 | 5/1985 | Conway . |
| 4,809,065 | 2/1989 | Harris et al. . |
| 4,960,311 | 10/1990 | Moss et al. . |
| 4,969,700 | 11/1990 | Haines . |
| 4,984,179 | 1/1991 | Waldern . |
| 5,424,866 | 6/1995 | Kikinis . |
| 5,452,414 | 9/1995 | Rosendahl et al. . |
| 5,515,498 | 5/1996 | Huering . |
| 5,621,906 | 4/1997 | O'Neil et al. . |
| 5,636,036 | 6/1997 | Ashbey . |

FOREIGN PATENT DOCUMENTS 2 034 554  6/1978  United Kingdom .

*Primary Examiner*—Xiao Wu
*Attorney, Agent, or Firm*—Richard C. Litman

[57] ABSTRACT

A holographic direct manipulation interface includes detecting means, holographic display means and processing means to enable a user to input commands to a computer and display the desired output. A CPU stores data that enables a holographic display unit to generate a holographic display or hologram. A motion detector detects the movement of an object designated by the user as a command object. The object whose motion is detected can be designated as a finger on the user's hand or any passive or active moveable object can be chosen to be designated as the command object. A command is implemented by a computer when the command object moves within a threshold distance of a command point located within, on or near the hologram, or when the command object performs a contact code.

13 Claims, 3 Drawing Sheets

HOLOGRAPHIC DIRECT MANIPULATION INTERFACE

BACKGROUND OF THE INVENTION

1. Field of the Invention

The present invention relates to a system which employs a holographic display interacting with a motion detector in order to determine the position of an input command object, which may be used to input a desired command into a computer. The system detects the position of the command object, or its performance of a contact code, with reference to its relative positions on a holographic display.

2. Description of the Related Art

Computers customarily require a user to input commands to direct the computer as to what information is desired. Usually a graphical user interface (GUI) displays a selection of choices that a user can select on a graphical display unit. The GUI also displays the desired information that the user has requested. Usually an input device, such as a button, keyboard, mouse or joystick is the means that a user has available to communicate his desired command to the computer.

U.S. Pat. No. 5,686,942 issued to James Ball on Nov. 11, 1997 describes an input device for a computer that uses a motion detector to determine the location of the user's nose. A curser displayed on a GUI corresponds to the motion of the user's nose. Thus, instead of using a mouse to move the curser the user moves his nose and the motion of the user's nose is correlated to that of the curser. The user moves his nose to select the desired command to be carried out by the computer.

A GUI displays information as text or an object in two dimensional space because a flat display screen is used. A three dimensional perspective also can be displayed in two dimensions. A GUI has not been described using three dimensional space which allows a user to input commands.

Holography is historically the art of recording optical data and reproducing the recorded information in a three dimensional display. U.S. Pat. No. 5,424,866 issued to Dan Kikinis on Jun. 13, 1995 describes an apparatus that creates a holographic display that can be dynamically manipulated by a computer.

U.S. Pat. No. 4,518,361 issued to Malcolm Conway on May 21, 1985 describes a two dimensional display unit with datum points located on a displayed object to select a desired change in a displayed object. No means have been disclosed to manipulate a three dimensional object by selecting a command with an input device displayed in three dimensions.

None of the above inventions and patents, taken either singularly or in combination, is seen to describe the instant invention as claimed. Thus, a holographic direct manipulation interface solving the aforementioned problems is desired.

SUMMARY OF THE INVENTION

Accordingly, it is a principal object of the holographic direct manipulation interface invention to provide a device which allows a user to input commands to a computer by means of a hologram instead of a GUI. Computer input commands are determined by means for detecting motion of a command object and by means of processing, which together interface and compare the location of an object relative to its location on a hologram. A command is input by a user by moving a command object or performing a sequence of moves within a threshold distance of a location, menu selection or command point on a holographic display or hologram. The computer implements the selected command by changing the displayed holograph as instructed by the user's command.

The motion detecting means detects movement and location of a command object controlled by the user. Detection can be accomplished by detecting a ray which is reflected by or sent from the command object. The detecting means may include a sensor for detecting electromagnetic radiation, when the reflected ray detected by the detecting means is a ray of electromagnetic radiation.

The holographic construction means displays a three dimensional holographic image or hologram. The hologram replaces the GUI since the hologram is what displays information and the commands the user sees. The hologram displays requested information and displays command choices to the user.

Processing means compares the location of the command object controlled by the user relative to the location of command points around, on and in the hologram to determine the user's desired command. When the command object comes within a threshold distance of the command point the command point is selected by the user, implemented by the CPU and the desired results are redisplayed as another hologram. Also, when the command object performs a sequence of moves, called a contact code, at a specified location, a command is selected by the user.

It is another object of the invention to implement the desired command by changing the hologram displayed to correspond to the user's input.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
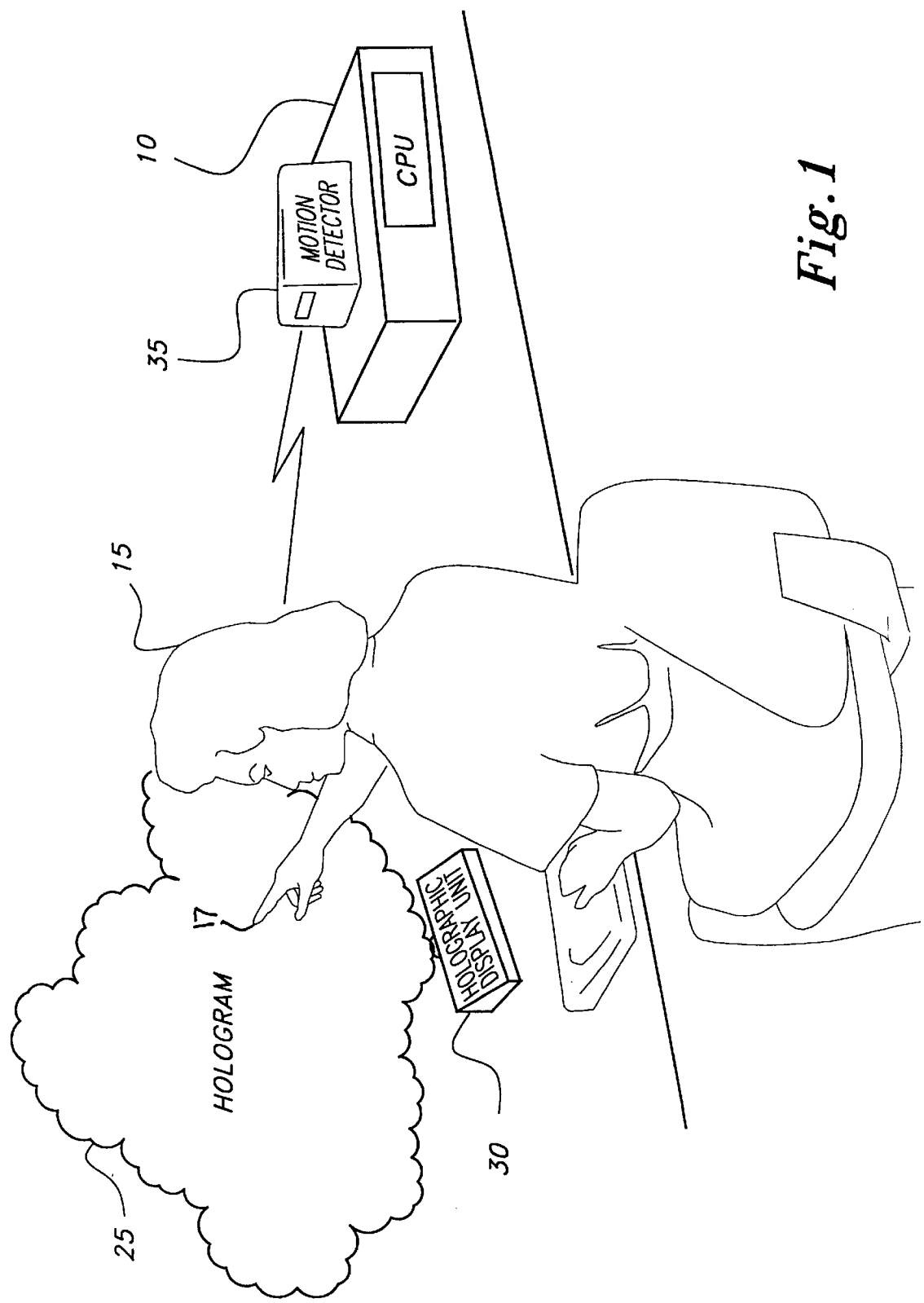
FIG. 1 is an environmental, perspective view of a holographic direct manipulation interface according to the present invention.

The present holographic direct manipulation interface invention includes motion detecting means, holographic display means and processing means to enable a user to input commands to a computer and display the desired output. FIG. 1 displays a user 15 in front of a three dimensional displayed hologram 25 that is next to a CPU 10 and motion detector 35. The motion detector monitors the location of the command object 17, such as the user's finger.

Figure 2:
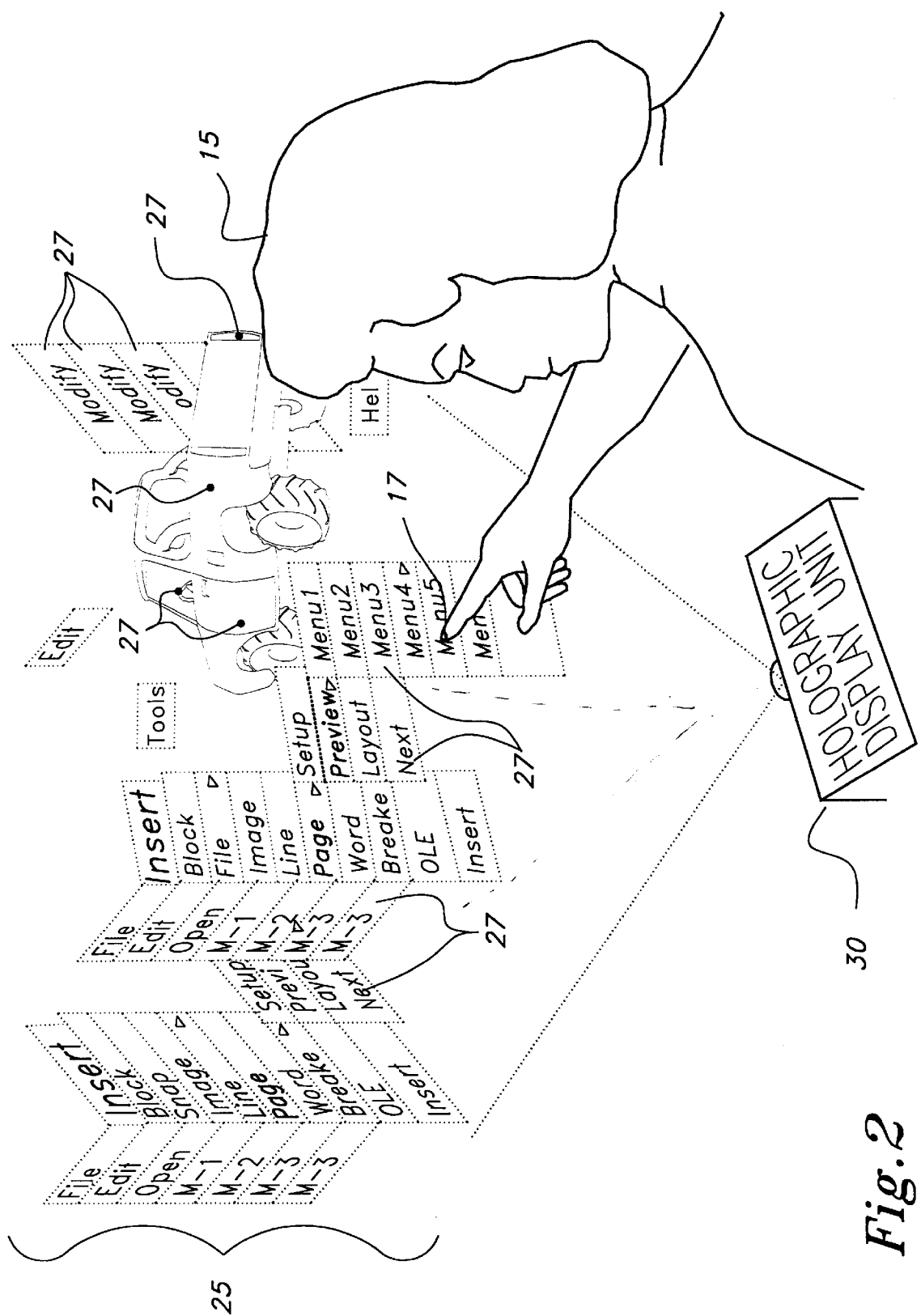
FIG. 2 is an environmental, perspective view of a hologram, a user and command points located within, on and near the hologram.

The computer input system described allows a user 15 to input a command to a computer 10 via a holographic display 25 or hologram by moving their finger to a location on the hologram that is a command point 27 (as shown in FIG. 2). The CPU 10 stores data that enables a holographic display unit 30 to generate a hologram 25. A motion detector 35 detects the movement of a command object 17. The command object 17 whose motion is detected may alternatively be designated as a finger on the user's hand or any other passively moveable object, such as a pointer stick. The command object 17 may also transmit a signal or ray to the motion detector 35. A processor compares the location of the command object 17 and its motion relative to the location of command points 27 to determine whether a command is being selected by the user 15. When the command object 17 passes within a threshold distance of a command point 27 or performs a contact code the selected command is performed.

When the computer is started and operating, a hologram 25 is displayed before a user, similar to the screen of a GUI, but the display is in three dimensions. Hologram should include but should not be limited to a three dimensional image of an object displayed in space. There is no monitor physically present or GUI that displays information. The hologram is projected in mid air from a holographic display unit 30. The display is in three dimensions described in the x, y and z axes of a coordinate reference system. The hologram 25 display is not limited to text and illustrations in only two dimensions. Text and objects that makeup the hologram occupy space in three dimensions. Text and objects are displayed parallel to the user 15, perpendicular to the user 15 and at angles from 0 to 90 degrees relative to the user 15. The holographic display unit 30 displays three dimensional objects, menu selections and/or data points in all three dimensions and this constitutes the hologram 25.

The user 15 is presented with a multitude of command points 27 in, on and around the hologram 25 from which they can choose. The user 15 selects a command point 27 which is being displayed as an object, menu selection or data point in the three dimensional display area. The user 15 may choose to perform a contact code, later discussed, instead of choosing a command point 27.

The means to produce a hologram 25 may be chosen from a number of commercially available devices that employ existing phase hologram, computer generated hologram and dynamic holographic display technologies among others.

FIG. 2 displays a user 10 who has designated their command object 17 as the tip of their finger. The user may designate any passive object, such as their finger, a pointer stick, etc., as a command object 17. The command object 17 is controlled by the user 15 and it is the instrument that enables the user 15 to communicate with the computer. The user 15 chooses where the command object 17 travels and the command points 27 desired to be selected. The user 15 moves the command object 17, their finger for example, to within a minimum threshold distance of a command point 27 or performs a contact code to chose a command. After a predetermined period programmed into the computer during which the command object is detected by the motion detector in that location, the command is initiated.

The invention is not limited to computer inputs. The invention can be used wherever a human-machine interface is required. Thus, the invention is applicable whenever an individual wants to make a choice and communicate the choice to a device. For example, it can be applied to an airplane cockpit, a nuclear reactor control panel or to something as simple as choosing the floor desired on an elevator. A hologram may be generated to display currently measured temperatures and present airspeed, as an illustration.

Selections, designated as command points, are displayed in the hologram also. Like the present embodiment shown, the user simply moves a command object to the command point 27 displayed in the hologram to select it. Thus, the user selects a new speed by moving his finger (designated as the command object 27) to the displayed speeds (which are command points 27) in the hologram 25 to communicate to the plane the new desired speed. The user, by moving the command object 17 or performing a contact code, chooses a computer command.

FIG. 2 displays an enlarged and detailed view of the hologram 25 and a user 10 using their finger as the command object 17 to designate a command by moving their finger within a threshold distance of the command point 27. An object is designated as the command object 17 by a user 15. The location of the command object 17 is continuously monitored by the motion detector 35. The command object's three dimensional location, designated by x, y and z coordinates, is continuously sent as output signals to the processor by the motion detector 35. The processor compares the location of the command object 17 to the stored data locations of displayed command points 27 in, on and around the hologram 25 that is presently displayed. Moving the command object 17 within a minimum threshold distance of a displayed command point 27 on the holograph selects the command. The command selected by the user is dependant on the command points 27 that are displayed in, on or around the hologram and of which command point 17 the user moves their command object 17 within a minimum threshold distance.

Moving the command object 17 within the three dimensional holograph, with command points 27 located all around (such as in front of, back of, top of and bottom of), must be carefully performed. Crossing the threshold area around a command point 27 with a command object 17 over a predetermined period of time selects the command associated with that command point 27.

Predetermined sequences of motion are stored in the CPU and are called contact codes. The locations of the command object 17 are being monitored by the processor to determine whether a contact code is performed by it. For example, a tapping motion on or near a command point 27, similar to double clicking with a mouse, indicates a command is sought to be implemented by the user 15. A plethora of predetermined contact codes are defined in the CPU 10 data storage unit that have defined commands associated with them. CPU 10 memory is comparing successive movements of the command object 17 performed within a threshold time frame with stored contact codes to determine whether a command is desired. The location the contact code is performed is also determined. The performance of a contact code within a minimum threshold distance of a command point 27 is important to determine the type of command selected. The command selected depends on the type of contact code performed and whether the contact code was performed within a threshold distance of a command point 27 displayed in, on or around the hologram. A contact code may be performed outside the threshold distance of a command point 27 to designate a command also.

The location of the designated command object 17 is monitored by a motion detector 35. A motion detector 35 should include but should not be limited to means to determine the x, y and z coordinates of an object. The means chosen to detect motion are available by a number of commercially available devices using electromagnetic radiation such as infrared radiation, visible light or electromagnetic radiation of other wavelengths or ultrasonic waves among others. Alternatively, the command object 17 may include means to emit a signal to communicate its location to a motion detector 35.

The x, y and z coordinates describing the location of the command object 17 are continuously sent to the CPU 10 from the motion detector 35 as output signals. The CPU 10 receives the signals that represent the location of the command object 17 and computes the distance between the command object 17 and command points 27. The x, y and z locations of all currently displayed command points 27 in, on and around the hologram 25 are saved in the CPU 10. The saved locations of each command point 27 are continuously compared to the locations sent to the CPU by the motion detector 35. When the proximity of the command object 17 is within a minimum threshold distance of the location of a command point 27 and over a predetermined period of time, the CPU 10 performs the chosen command.

Figure 3:
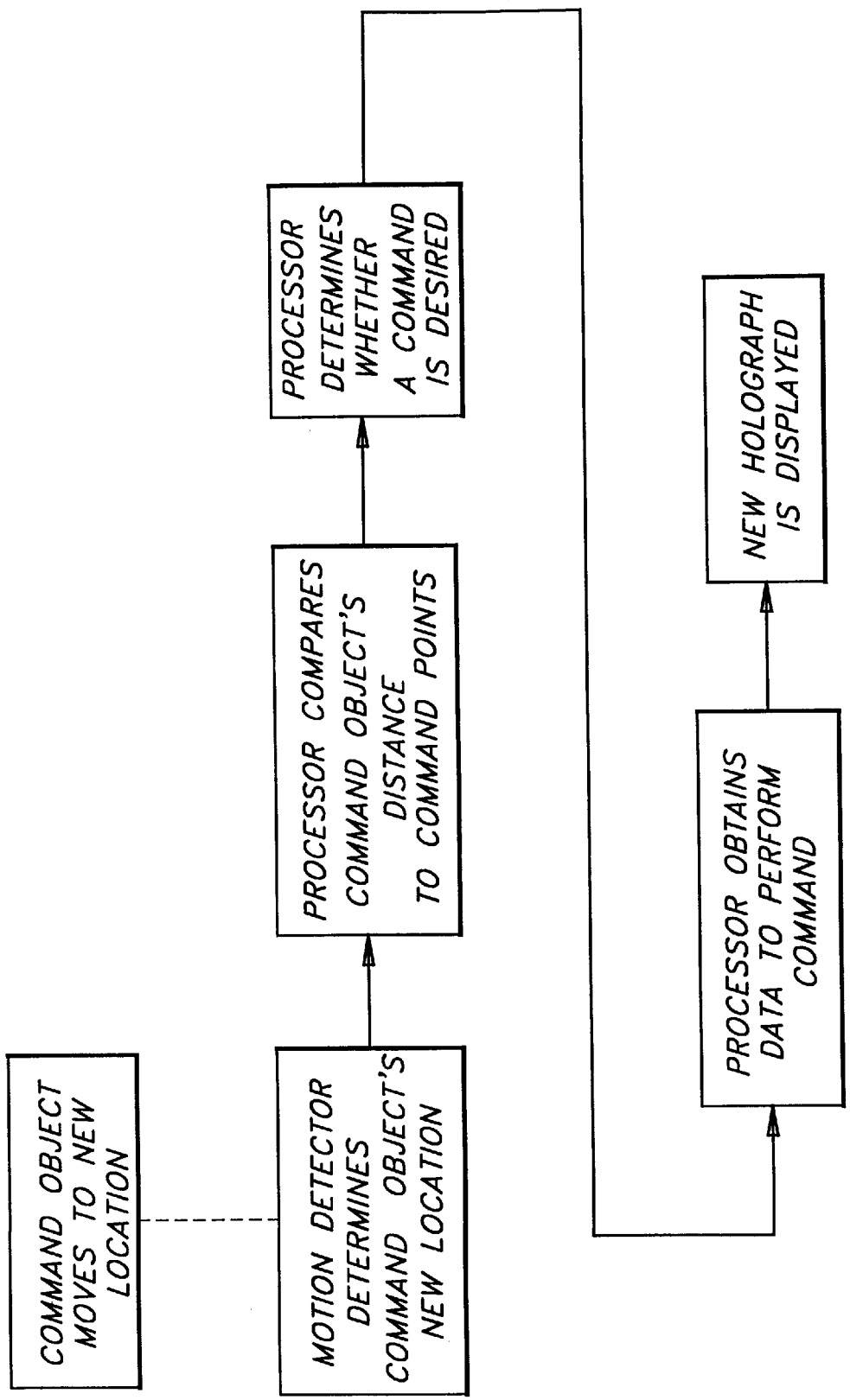
FIG. 3 is a block diagram that shows the communication steps and components involved in implementing a command to the CPU with a hologram and motion detector.

Parallel processing is being performed by the CPU 10 to determine whether the command object 17 has performed a contact code also. The processor saves the signals representing the locations of the command object 17 for a minimum amount of time. Motions by the command object 17 within the predetermined time are compared to contact codes to determine whether there is a match. The location of the performance of a contact code and its type is monitored to correlate it to the desired command. When the CPU 10 determines that a contact code has been performed the type of contact code and whether it was performed within a minimum threshold distance of a command point 27 is determined. The type of contact code, whether it was performed within a minimum distance of a command point 27 and what command point 27 it was performed at, enables the CPU 10 to compare these factors with predetermined codes to determine the command desired. After the desired command is determined, a command signal is sent to the CPU 10 to implement the desired command as illustrated in FIG. 3. The CPU 10 sends the required data and instructions to the holographic display unit 30 that redisplays the requested information in another hologram 25 with relevant command points 27 pertinent for the requested display.

When the command object 17 is moved to another command point 27 or a contact code is performed the motion detector 35 repeats the above steps of sending the command object's position as a signal to the CPU 10, the CPU compares the command object's location and/or motion to determine the desired command which is implemented by displaying another hologram.

It is to be understood that the present invention is not limited to the embodiments described above, but encompasses any and all embodiments within the scope of the following claims.

I claim:

1. A holographic direct manipulation interface comprising:
    a means for constructing and displaying a hologram;
    detecting means for detecting the movement and location of a physical command object directly relative to the displayed hologram;
    processing means for converting the detected location of the physical command object directly relative to its position on the displayed hologram into an output signal.

2. holographic direct manipulation interface according to claim 1 wherein the detecting means is selected from the group consisting of detectors of a ray reflected by a command object and detectors of a ray sent from a command object.

3. holographic direct manipulation interface according to claim 1, wherein the processing means includes means for converting the motion of the command object relative to its position on the hologram into an output signal.

4. A holographic direct manipulation interface according to claim 1, wherein the detecting means includes means for detecting movement of a command object by detecting at least the position of the command object.

5. A holographic direct manipulation interface according to claim 1, wherein the detecting means includes means for detecting movement of a command object by detecting at least a change in the position of the object.

6. A holographic direct manipulation interface according to claim 1, wherein the detecting means comprise a sensor for detecting electromagnetic radiation, and a reflected ray detected by the detecting means is a ray of electromagnetic radiation.

7. A holographic direct manipulation interface according to claim 1, wherein the detecting means comprise a sensor for detecting electromagnetic radiation, and a transmitted ray detected by the detecting means is a ray of electromagnetic radiation.

8. A holographic direct manipulation interface according to claim 1, wherein the detecting means comprise a sensor for detecting an ultrasonic wave that is reflected from the command object.

9. A holographic direct manipulation interface according to claim 1, wherein said means for constructing said hologram include means to produce a phase hologram.

10. A holographic direct manipulation interface according to claim 1, wherein said means for constructing said hologram include means to produce a computer generated hologram.

11. A holographic direct manipulation interface according to claim 1, wherein said means for constructing said hologram include means to produce a dynamic hologram.

12. A method of inputting commands into a computer by a user comprising the steps of:
    detecting the movement and location of a physical command object directly relative to a displayed hologram;
    processing the detected location of the physical command object directly relative to its position on the displayed hologram; and,
    converting the processed location of the physical command object into an output signal.

13. A method of inputting commands into a computer by a user comprising the steps of:
    detecting the movement and location of a physical command object directly relative to a displayed hologram;
    processing a contact code based on the detected movement and location of the physical command object; and,
    converting the processed contact code into an output signal.

\* \* \* \* \*